No. 841,627.
PATENTED JAN. 15, 1907.
N. H. CLOUD, Jr.
RULE.
APPLICATION FILED MAR. 24, 1906.
3 SHEETS—SHEET 2.
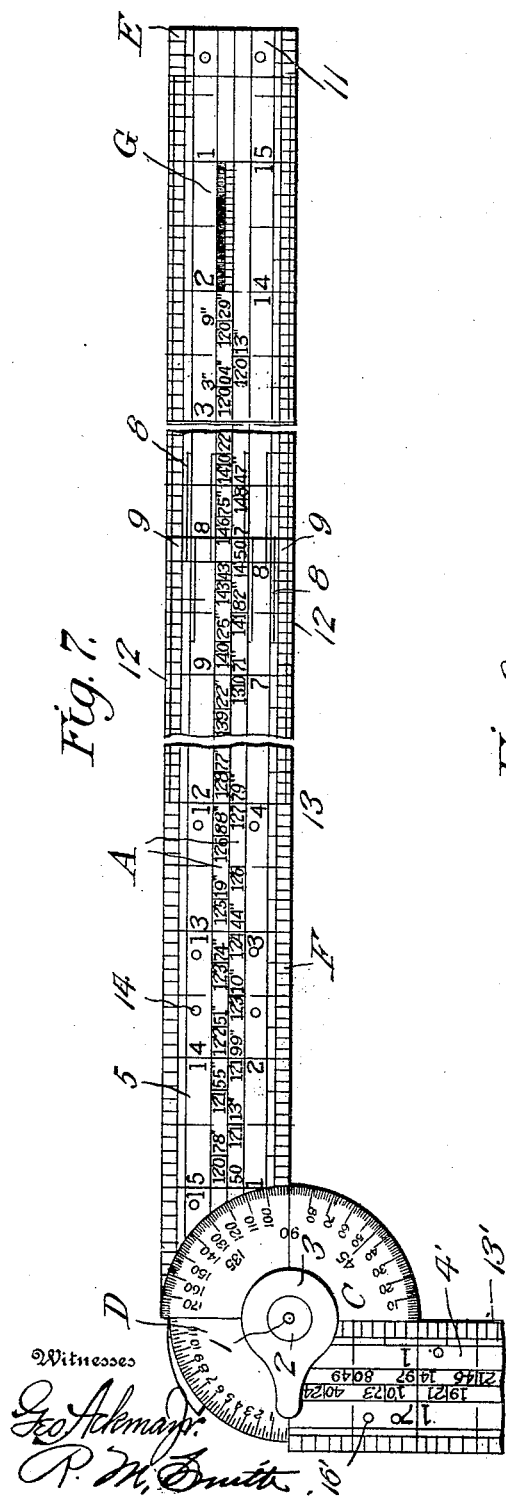
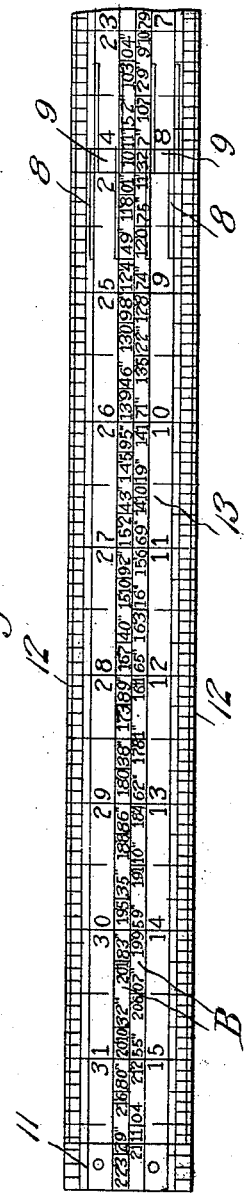
Witnesses
Geo Ackman
R. M. Smith
Inventor
Newton H. Cloud Jr
By Victor J. Evans
Attorney No. 841,627. PATENTED JAN. 15, 1907.
N. H. CLOUD, Jr.
RULE.
APPLICATION FILED MAR. 24, 1906.
3 SHEETS—SHEET 3.
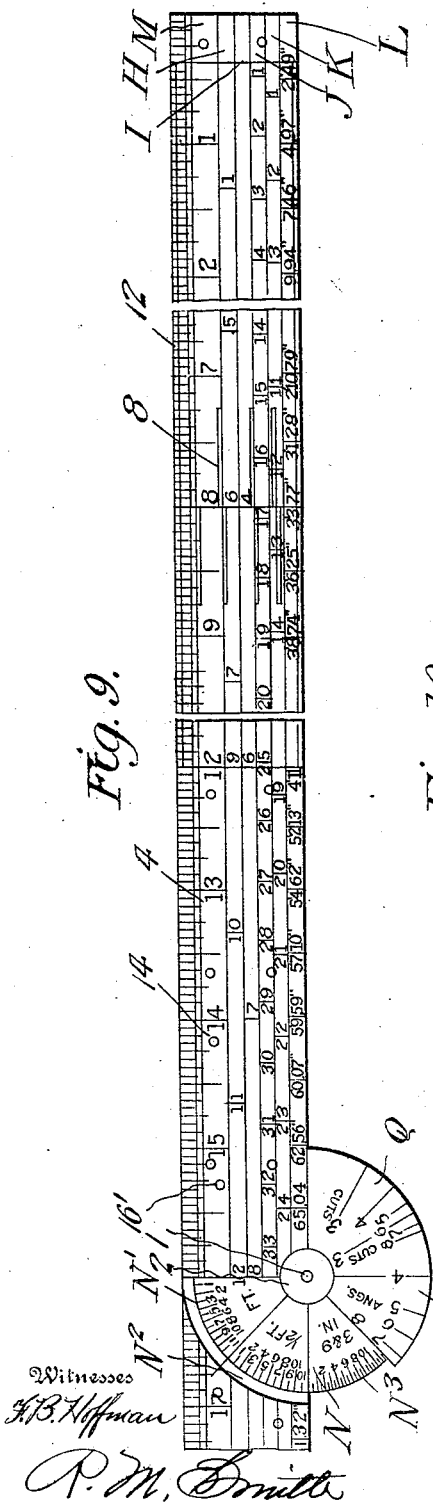
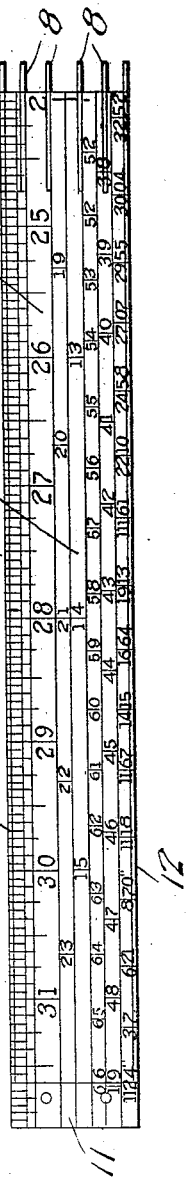
Witnesses
F. B. Hoffman
P. M. Smith
Inventor
Newton H. Cloud Jr
By
Victor J. Evans
Attorney
THE NORRIS PETERS CO., WASHINGTON, D. C.

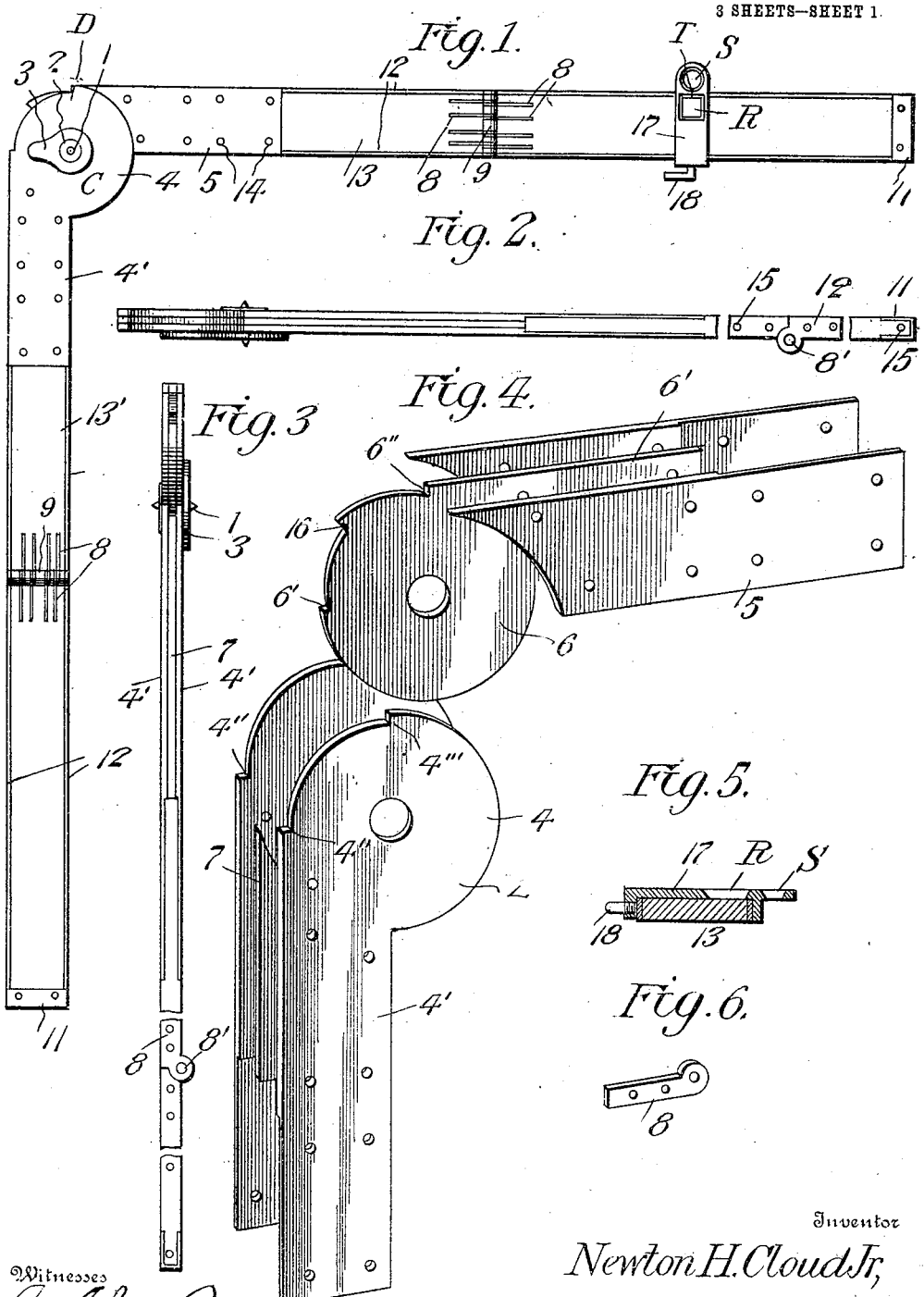

UNITED STATES PATENT OFFICE.

NEWTON H. CLOUD, JR., OF WILMINGTON, DELAWARE.

RULE.

No. 841,627.   Specification of Letters Patent.   Patented Jan. 15, 1907.

Application filed March 24, 1906. Serial No. 307,908.

*To all whom it may concern:*

Be it known that I, NEWTON H. CLOUD, Jr., a citizen of the United States, residing at Wilmington, in the county of Newcastle and State of Delaware, have invented certain new and useful Improvements in Rules, of which the following is a specification.

This invention relates to rules, and has for its object to provide a combination-rule whereby the various calculations necessary in the every-day work of a carpenter or builder may be quickly arrived at without the necessity of figuring out each calculation after obtaining the necessary dimensions. In other words, the object of the present invention is to provide a rule embodying certain novel features of construction and arrangement whereby scales and indicating devices or gages are provided for rafters, braces, joists, shingles, and angles, enabling the workman upon obtaining certain measurements to obtain other measurements, such as angles and cuts of articles of each kind necessary, such as shingles, joists, rafters, and the like.

With the above and other objects in view, the nature of which will more fully appear as the description proceeds, the invention consists in the novel construction, combination, and arrangement of parts hereinafter more fully described, illustrated, and claimed.

In the accompanying drawings, Figure 1 is a plan view of a rule embodying the present invention, the scales and indicating devices being omitted. Fig. 2 is an edge view of one arm or member of the rule. Fig. 3 is a similar view of the other arm or member of the rule. Fig. 4 is an enlarged detail perspective view showing the main joint of the rule with the several parts thereof disconnected. Fig. 5 is a cross-section through one arm of the rule, showing the manner of combining a compass attachment therewith. Fig. 6 is a detail perspective view of one of the middle plates or minor joint-plates of the rule-arms. Fig. 7 is an enlarged plan view of the rule looking toward one side thereof with one of the arms broken off. Fig. 8 is a plan view of the remainder of the arm omitted from Fig. 7. Fig. 9 is also an enlarged plan view of the rule looking toward the opposite face thereof and having one of the arms or members thereof broken off. Fig. 10 is a plan view of the arm shown removed from Fig. 9.

Referring to the drawings, it will be seen that the main rule-joint is composed of joint-plates 5, arranged at opposite sides of one of the arms 13 of the rule, while between the plates 5 is interposed the shank 6' of an indicator-head 6, which is provided with a hole for the reception of the pivot 2 of the joint. Connected to the other arm 13' of the rule are similar joint-plates 4', having substantially circular or disk-shaped protractor-heads 4, which lie on opposite sides of the indicator-head 6, the protractor-heads 4 being integral with the plates 4' and being therefore carried by and rigidly connected with the arm or member 13' of the rule.

7 designates a division-plate arranged between the joint-plates 4 and extending to the edge or periphery of the indicator-head 6.

It will be understood that the body portions of the arms or members 13 and 13' are preferably composed of wood and that the plates 4' are secured to opposite sides of said arms or members, while the plates 6' and 7 are arranged between the plates 4' and 5, all of said plates being riveted together in the ordinary manner and as indicated in Fig. 1.

The protractor-heads 4 are provided at points ninety degrees apart with radially-projecting shoulders 4'' and 4''', while the indicator-head 6 is provided with corresponding shoulders 6' and 6'', located ninety degrees apart and adapted to register with the shoulders 4'' and 4''' when the arms or members 13 and 13' stand at a right angle to each other. The indicator-head 6 is also provided with a radially-projecting shoulder 16, having a notch therein adapted to come in contact with a stop-pin 16', Fig. 7, on the arm or member 13', said pin 16' extending across between the joint-plates 4'.

Extending through the pivot 2 is a pin 1, the extremities of which are pointed to form projecting studs or spurs, as best shown in Fig. 3, to enable the device to be used as a plumb-bob by holding such pointed studs or spurs between the thumb and forefinger, while the arms of the rule are closed together in parallel relation for indicating a vertical line or when they are held at a right angle to each other for indicating a true horizontal line by their lower extremities, which lie in the same horizontal plane. 3 designates a threaded pivot-clamp lever mounted on the pivot 2, by means of which the joint between the arms of the rule may be held rigidly while using the device to indicate a vertical or horizontal line.

The rule is also adapted to be used as a compass for scribing circles, in which case a compass attachment 17 (shown in Figs. 1 and 5) is associated with one of the arms or members of the rule, said compass attachment embodying a body portion which extends transversely across the arm of the rule and flanges which extend across and embrace the side edges of the rule, one of said flanges carrying a binding-screw 18, which passes through the flange and impinges against the edge of the rule and is provided with a crank or handle portion whereby it may be manipulated. The compass attachment is also provided with an observation-opening R, through which the graduations or scales may be seen, and said attachment is further provided with a projecting portion through which a pencil-opening S is formed, enabling a pencil to be inserted therethrough to scribe the circle or arc, of which the pin 1 is the center, it being apparent that either pointed extremity of the pin 1 may be pressed into the surface upon which the circle or arc is being scribed.

T designates a gage-mark to enable the compass attachment to be brought into exact register with any graduation of the desired scale, after which the compass attachment may be fixed at the desired point by means of the screw 18.

Each of the arms 13 and 13' is provided with a metal tip 11 at its extremity and is also provided midway of its length with a hinge-joint comprising overlapping strips or plates 8 and interposed washers 9, through all of which passes a hinge-pin 8'. The said edges of the arms or members 13 and 13' are faced with metallic binding-strips 12, held in place by through-rivets 15.

14 designates the rivets which secure the joint-plates and the interposed parts together.

A, Fig. 7, designates the rafter-scale for indicating the lengths of rafters of different pitches. For example, for a length of rafter with a three-foot rise and twelve-foot run attention is directed to the three-inch mark, at which point the designating-numerals indicate that the length of the rafter should be twelve feet four and forty-four hundredths inches.

B, Fig. 8, designates the brace-scale, the use of which is as follows: To obtain the length of a brace having a ten-foot rise, attention is directed to the ten-inch mark, which indicates that the length of the brace should be fourteen feet one and seventy-one hundredths inches.

C designates the hemispherical protracting-scale, and D the straddle-angle scale for indicating the pitch or angle of the peaks of roofs in laying out the rafters.

E and G designate scales divided into one-tenth, one-twelfth, and one-hundredth inch graduations.

The joist-scale H is used for indicating the number of joists, and its use is as follows: For an eight-foot joist attention is directed to the eight-inch mark, which gives a result of six.

I designates the rafter-scale, and in order to obtain the number of rafters attention is directed to the inch-marks. Thus, for an eight-foot rafter attention is directed to the eight-inch mark, which gives a result of four, and for a fourteen-foot rafter attention is directed to the fourteen-inch mark, which gives a result of seven.

The shingle-scale J is used as follows: To obtain the number of shingles required by a roof of a certain size, the builder proceeds as follows: Suppose one side of a roof is thirteen feet by twenty-eight feet. Attention is directed to the thirteen-inch mark, which indicates twenty-seven, then to the twenty-eight-inch mark, which gives fifty-nine. We now multiply fifty-nine by twenty-seven, which gives a result of fifteen hundred and ninety-three. If the other side of the roof is of the same dimensions, we multiply by two, thus giving a result of three thousand one hundred and eighty-six, which is the number of shingles required for the roof. The calculations upon which the scale J is based refer to shingles six inches wide, while the shingle-scale K has reference to shingles eight inches wide, the same process being utilized in connection with both scales.

L designates the octagonal scale for arriving at the length of the sides of octagon structures. To obtain the length of the side of an octagon, attention is directed to the inch-marks, as above. Thus for an octagon twelve feet wide look under the twelve-inch mark, which indicates four feet eleven and sixty-five hundredths inches, and so on.

M designates a sixteen-inch scale similar to an ordinary measuring-rule.

N designates the scale for indicating the plumb-cuts of rafters, and it will be noted that the rafter-scale is divided into three sections, one of the sections N' being used for one to three feet and eight-foot rises; the second section N'' being used for six-feet, one-foot six-inch, three-feet six-inch, and five-feet six-inch rises, and the third section N''' being used for three-inch, nine-inch, one-foot three-inch, one-foot nine-inch, and five-foot three-inch rises. The rule with the arms separated is placed on top of the rafter, whereupon the scale will indicate the necessary cut. Heel-cuts are indicated in the same way as plumb-cuts, the rule, however, being placed on the bottom of the rafter.

The scale P is used to indicate the angles of figures, such as octagons, hexagons, squares, equilateral triangles, and other polygonal figures.

The scale Q designates cuts to be made to correspond with the angles indicated by the scale P.

In using the rule as a level the spurs or studs 1 are held between the thumb and forefinger, while the arms or members of the rule are at right angles to each other, or substantially so, whereupon the extremities of the arms will lie in the same horizontal plane.

To use the rule as a plumb, the arms or members thereof are folded together and the rule suspended between the thumb and forefinger, as just previously described, whereupon each side of the rule will dispose itself in a true vertical line.

I claim—

1. A rule comprising arms or members connected by a rule-joint, oppositely-arranged protractor-heads connected to one arm, an indicator-head carried by the other arm and interposed between the protractor-heads, the said protractor-heads and indicator-head being provided with radially-projecting shoulders located ninety degrees apart, and a projecting radially-disposed indicating-shoulder on one of said heads, substantially as described.

2. A rule comprising arms connected by a rule-joint embodying oppositely-arranged protractor-heads, a stop-pin connecting said heads and concealed between said heads, an indicator-head carried by the other arm and interposed and working between said protractor-heads and having a shoulder adapted to come in contact with said stop-pin when the arms are in line with each other, the protractor-heads and the indicator-head being provided with radially-extending shoulders located ninety degrees apart.

3. A rule comprising arms or members connected by a rule-joint, pointed studs or spurs extending outward from the axis of movement of said arms or members at both sides of the rule, and a compass attachment adjustable lengthwise of one of said arms and detachably mounted thereon, said compass attachment being provided with a scribing-aperture.

4. A rule comprising arms or members connected by a rule-joint, the pivot-clamp of which projects at one side, a pivot-lever mounted on said projecting end, and a pin extending centrally through the pivot and having its opposite ends pointed and projecting, substantially as and for the purpose described.

In testimony whereof I affix my signature in presence of two witnesses.

NEWTON H. CLOUD, Jr.

Witnesses:
NEWTON H. CLOUD,
ANNA M. CLOUD.